United States Patent
Qiu

(10) Patent No.: US 12,242,324 B2
(45) Date of Patent: Mar. 4, 2025

(54) SYSTEM POWER CONSUMPTION CONTROL METHOD AND ELECTRONIC DEVICE FOR DISABLING A NETWORK CONNECTION OF THE ELECTRONIC DEVICE WHEN THE ELECTRONIC DEVICE IS IN A FIRST MODE

(71) Applicant: Honor Device Co., Ltd., Shenzhen (CN)

(72) Inventor: Jianbin Qiu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/904,472

(22) PCT Filed: Apr. 24, 2022

(86) PCT No.: PCT/CN2022/088777
§ 371 (c)(1),
(2) Date: Aug. 17, 2022

(87) PCT Pub. No.: WO2023/015945
PCT Pub. Date: Feb. 16, 2023

(65) Prior Publication Data
US 2024/0211017 A1 Jun. 27, 2024

(30) Foreign Application Priority Data
Aug. 11, 2021 (CN) .................. 202110918392.X

(51) Int. Cl.
*G06F 1/32* (2019.01)
*G06F 1/3212* (2019.01)
*G06F 1/3234* (2019.01)

(52) U.S. Cl.
CPC .......... *G06F 1/3278* (2013.01); *G06F 1/3212* (2013.01)

(58) Field of Classification Search
CPC .............................. G06F 1/3278; G06F 1/3212
See application file for complete search history.

(56) References Cited

U.S. PATENT DOCUMENTS 5,983,357 A * 11/1999 Sun ................. G06F 1/3215
 713/320
6,473,855 B1 * 10/2002 Welder ............. G06F 9/4401
 710/33

(Continued)

FOREIGN PATENT DOCUMENTS

CN 102098392 A 6/2011
CN 102256019 A 11/2011

(Continued)

OTHER PUBLICATIONS

Macej, G., "Avast Battery Saver extends your Android's battery life", URL:https://blog.avast.com/2015/03/04/avast-battery-saver-extends-your-androids-battery-life/, Mar. 4, 2015, 2 pages.

(Continued)

*Primary Examiner* — Danny Chan
(74) *Attorney, Agent, or Firm* — Slater Matsil, LLP

(57) ABSTRACT

A system power consumption control method includes: determining that an electronic device has entered a first mode; determining, by the electronic device, a power loss amount of a battery and a communication count of background processes, where the power loss amount is a decrease of power with respect to power at a first moment, the first moment is a moment at which the electronic device enters the first mode, and the communication count is used for indicating a total communication count of all processes currently running in the background with other devices since power-on of the electronic device; and when the power loss amount reaches a preset power threshold and the communication count reaches a preset communication count, dis- (Continued)

abling, by the electronic device, a network communication connection.

20 Claims, 8 Drawing Sheets

(56) References Cited

U.S. PATENT DOCUMENTS

| | | | |
|---|---|---|---|
| 9,158,368 | B2 | 10/2015 | Wang et al. |
| 10,268,254 | B2 | 4/2019 | Desai et al. |
| 2009/0228724 | A1 | 9/2009 | Chinen et al. |
| 2010/0235663 | A1* | 9/2010 | Olsson .................. G06F 1/3234 713/323 |
| 2012/0185577 | A1* | 7/2012 | Giaretta .................. H04W 4/16 709/223 |
| 2012/0260118 | A1* | 10/2012 | Jiang ..................... G06F 9/4893 713/340 |
| 2014/0362768 | A1* | 12/2014 | Wood ................ H04W 52/0258 370/328 |
| 2016/0212709 | A1* | 7/2016 | Park .................. H04W 52/0216 |
| 2017/0024243 | A1* | 1/2017 | Kishan .................. G06F 1/3287 |
| 2017/0060225 | A1* | 3/2017 | Zha ........................ G06F 1/3212 |
| 2017/0237185 | A1 | 8/2017 | Tamura et al. |
| 2019/0380092 | A1 | 12/2019 | Buck et al. |

FOREIGN PATENT DOCUMENTS

| | | |
|---|---|---|
| CN | 103228031 A | 7/2013 |
| CN | 102647527 B | 7/2015 |
| CN | 105183135 A | 12/2015 |
| CN | 106936557 A | 7/2017 |
| CN | 104268009 B | 7/2018 |
| CN | 109661022 A | 4/2019 |
| CN | 107835311 B | 5/2020 |
| CN | 107832131 B | 7/2020 |
| EP | 1736850 B1 | 9/2009 |
| WO | 2009070415 A1 | 6/2009 |
| WO | 2017123414 A1 | 7/2017 |

OTHER PUBLICATIONS

Sathyamoorthy, P. et al., "Profiling Energy Efficiency and Data Communications for Mobile Internet of Things", Hindawi, Wireless Communications and Mobile Computing, vol. 2017, Article ID 6562915, https://doi.org/10.1155/2017/6562915, Nov. 7, 2017, 16 pages.

Saranya, G., et al., "An Efficient Power Saving Technique Based Location Alarm for Smart Phones", National Conference on Mathematical Techniques and its Applications (NCMTA 18), Journal of Physics: Conf. Series, Jan. 1, 2018, 8 pages.

González-Canete, F.J., "Consumption Analysis of Smartphone based Fall Detection Systems with Multiple External Wireless Sensors", Sensors, vol. 20, No. 3, URL:https://www.mdpi.com/624466, Jan. 22, 2020, pp. 1-27.

Zih Corp., "User Guide for Android 7.1.2 Nougat", URL:https://amlabels.co.uk/pub/media/downloads/Zebra-MC3300-Android-7-Manual.pdf, Jan. 1, 2018, 222 pages.

* cited by examiner

SYSTEM POWER CONSUMPTION CONTROL METHOD AND ELECTRONIC DEVICE FOR DISABLING A NETWORK CONNECTION OF THE ELECTRONIC DEVICE WHEN THE ELECTRONIC DEVICE IS IN A FIRST MODE

CROSS-REFERENCE TO RELATED APPLICATIONS

This application is a National Stage of International Application No. PCT/CN2022/088777, filed on Apr. 24, 2022, which claims priority to Chinese Patent Application No. 202110918392.X, filed on Aug. 11, 2021. Both of the aforementioned applications are hereby incorporated by reference in their entireties.

TECHNICAL FIELD

This application relates to the field of electronic technologies, and in particular, to a system power consumption control method and an electronic device.

BACKGROUND

With continuous development of communications technologies, electronic devices, such as mobile phones, tablet computers, and smart electronic devices, provide increasingly powerful functions.

Currently, the electronic devices generally use a multitasking technology to run a plurality of different application programs or processes simultaneously. However, at night or when users do not use the electronic devices, the plurality of started application programs are usually not closed, such that the processes of such application programs are running in the background. When the background processes communicate frequently, internal resources of the electronic devices are occupied, and power is rapidly consumed, shortening use time of the electronic devices and affecting user experience.

SUMMARY

In view of this, this application provides a system power consumption control method and an electronic device, which can control communication of background processes at night or in other environments, to prevent power of the electronic device from being rapidly consumed, thereby ensuring use time of the electronic device and improving user experience.

Some embodiments of this application provide a system power consumption control method. The following describes this application from a plurality of aspects. For embodiments and beneficial effects of the following plurality of aspects, reference may be made to each other.

According to a first aspect, this application provides a system power consumption control method, applied to an electronic device. The method includes: determining that the electronic device has entered a first mode, such as a sleep mode, a low-power state, or a not-in-use state of the electronic device; determining, by the electronic device, a power loss amount of a battery and a communication count of background processes, where the power loss amount is a decrease of power with respect to power at a first moment, the first moment is a moment at which the electronic device enters the first mode, and the communication count is used for indicating a total communication count of all processes currently running in the background with other devices since power-on of the electronic device; and when the power loss amount reaches a preset power threshold and the communication count reaches a preset communication count, disabling, by the electronic device, network communication.

According to the method in this embodiment of this application, when the electronic device enters the first mode, the electronic device controls a network communication connection by monitoring power of the battery and the background process communication, which can prevent rapid power consumption of the electronic device from affecting user experience.

In a possible implementation of the foregoing first aspect, the determining, by the electronic device, a power loss amount of a battery includes: obtaining, by the electronic device, initial power of the battery corresponding to the first moment and current power of the battery at a current moment, and obtaining a power loss amount of the battery corresponding to the current moment by subtracting the current power from the initial power. The power loss amount since the electronic device enters the first mode can be determined by subtracting the current power from the initial power obtained when the electronic device enters the first mode, helping the electronic device to control the communication in a timely manner.

In a possible implementation of the foregoing first aspect, the method further includes: when the electronic device determines that within a first preset duration, the power loss amount has reached the preset power threshold and a communication count variation has reached a preset variation, disabling, by the electronic device, a network communication connection. In the method, when the power loss amount is reduced too fast and the communication is too frequent, a network connection interface (power control) is controlled to prevent the rapid power consumption from affecting the user experience.

In a possible implementation of the foregoing first aspect, the determining, by the electronic device, a power loss amount of a battery includes:

obtaining, by the electronic device, power corresponding to a second moment and current power of the battery at a current moment, where the second moment is a start moment of a second preset duration, and the second preset duration is a duration within which power records are kept; and obtaining a power loss amount of the battery corresponding to the current moment by subtracting the current power from the power corresponding to the second moment, where the second preset duration is greater than the first preset duration. In the method, the power records within the second preset duration are kept, making the kept power records more representative. In addition, timely deletion of earlier records can reduce memory consumption. Moreover, the second preset duration being greater than the first preset duration ensures that effective data can be obtained within a specified preset duration.

In a possible implementation of the foregoing first aspect, the electronic device determines a communication count variation of the battery corresponding to the current moment, including: obtaining, by the electronic device, a communication count corresponding to the second moment and a current communication count, and obtaining the communication count variation by subtracting the communication count corresponding to the second moment from the current communication count. In the method, communication count records within the second preset duration are kept, making the kept communication count records more representative. In addition, timely deletion of earlier records can reduce the memory consumption.

In a possible implementation of the foregoing first aspect, the determining that the electronic device has entered a first mode includes: determining, by the electronic device based on at least one of ambient light data, touchscreen data, motion posture data of the electronic device, GPS data, and user sleep data, that the electronic device has entered the first mode.

In a possible implementation of the foregoing first aspect, the first mode includes the sleep mode, the low-power state, or the not-in-use state.

In a possible implementation of the foregoing first aspect, when the electronic device receives user operation data, the network communication connection is enabled.

In a possible implementation of the foregoing first aspect, the user operation data includes at least one of operation data of tapping a touchscreen and operation data of a location change of the electronic device.

According to a second aspect, this application discloses an electronic device, including:
  a memory, configured to store instructions to be executed by one or more processors of the device; and
  a processor, configured to: determine that the electronic device has entered a first mode; determine a power loss amount of a battery and a communication count of background processes, where the power loss amount is a decrease of power with respect to power at a first moment, the first moment is a moment at which the electronic device enters the first mode, and the communication count is used for indicating a total communication count of all processes currently running in the background with other devices since power-on of the electronic device; and when the power loss amount reaches a preset power threshold and the communication count reaches a preset communication count, control a network interface switch to disable network communication.

According to the electronic device in this embodiment of this application, when the electronic device enters the first mode, the electronic device controls to disable the network interface by monitoring power of the battery and the background process communication, which can prevent rapid power consumption of the electronic device from affecting user experience.

In a possible implementation of the foregoing second aspect, the processor is configured to obtain initial power of the battery at the first moment and current power of the battery at a current moment, and obtain a power loss amount of the battery corresponding to the current moment by subtracting the current power from the initial power. The power loss amount since the electronic device enters the first mode can be determined by subtracting the current power from the initial power obtained when the electronic device enters the first mode, helping the electronic device to implement timely control.

In a possible implementation of the foregoing second aspect, the processor is further configured to: when it is determined that within a first preset duration, the power loss amount of the electronic device has reached the preset power threshold and a communication count variation has reached a preset variation, control the network interface switch to disable the network communication. In the method, when the power loss amount is reduced too fast and the communication is too frequent, a network connection interface (power control) is controlled to prevent the rapid power consumption from affecting the user experience.

In a possible implementation of the foregoing second aspect, the processor obtains power corresponding to a second moment and current power of the battery at a current moment, where the second moment is a start moment of a second preset duration, and the second preset duration is a duration within which power records are kept; and obtains a power loss amount corresponding to the current moment by subtracting the current power from the power corresponding to the second moment, where the second preset duration is greater than the first preset duration. The power records within the second preset duration are kept in the electronic device, making the kept power records more representative. In addition, timely deletion of earlier records can reduce memory consumption. Moreover, the second preset duration being greater than the first preset duration ensures that effective data can be obtained within a specified preset duration.

In a possible implementation of the foregoing second aspect, the processor is configured to obtain a communication count corresponding to the second moment and a current communication count, and obtain a communication count variation by subtracting the communication count corresponding to the second moment from the current communication count. Communication count records within the second preset duration are kept in the electronic device, making the kept communication count records more representative. In addition, timely deletion of earlier records can reduce the memory consumption.

In a possible implementation of the foregoing second aspect, the processor determines, based on at least one of ambient light data, touchscreen data, motion posture data, and user sleep data collected by sensors, and GPS data obtained by a communication unit, that the electronic device has entered the first mode.

In a possible implementation of the foregoing second aspect, the first mode includes a sleep mode, a low-power state, or a not-in-use state.

In a possible implementation of the foregoing second aspect, when the processor receives user operation data, a network communication connection is enabled.

In a possible implementation of the foregoing second aspect, the user operation data includes at least one of operation data of tapping a touchscreen and operation data of a location change of the electronic device.

According to a third aspect, this application further provides an electronic apparatus, including:
  a determining module, configured to determine that an electronic device has entered a first mode;
  a processing module, configured to determine a power loss amount of a battery and a communication count of background processes, where the power loss amount is a decrease of power with respect to power at a first moment, the first moment is a moment at which the electronic device enters the first mode, and the communication count is used for indicating a total communication count of all processes currently running in the background with other devices since power-on of the electronic device; and
  a network management module, configured to: when the power loss amount reaches a preset power threshold and the communication count reaches a preset communication count, disable network communication.

According to the electronic apparatus in this embodiment of this application, when the electronic device enters the first mode, the electronic apparatus controls to disable the network interface by monitoring power of the battery and the background process communication, which can prevent rapid power consumption of the electronic device from affecting user experience.

In a possible implementation of the foregoing third aspect, the processing module obtains initial power of the battery corresponding to the first moment and current power of the battery at a current moment, and obtains a power loss amount corresponding to the current moment by subtracting the current power from the initial power. The power loss amount since the electronic device enters the first mode can be determined by subtracting the current power from the initial power obtained when the electronic device enters the first mode, helping the electronic device to implement timely control.

In a possible implementation of the foregoing third aspect, the processing module is further configured to: when it is determined that within a first preset duration, the power loss amount of the electronic device has reached the preset power threshold and a communication count variation has reached a preset variation, control the network management module to disable the network communication. When the power loss amount is reduced too fast and the communication is too frequent, the electronic apparatus controls a network connection interface (power control) to prevent the rapid power consumption from affecting the user experience.

In a possible implementation of the foregoing third aspect, the processing module obtains power corresponding to a second moment and current power of the battery at a current moment, where the second moment is a start moment of a second preset duration, and the second preset duration is a duration within which power records are kept; and obtains a power loss amount corresponding to the current moment by subtracting the current power from the power corresponding to the second moment, where the second preset duration is greater than the first preset duration. The power records within the second preset duration are kept in the electronic apparatus, making the kept power records more representative. In addition, timely deletion of earlier records can reduce memory consumption. Moreover, the second preset duration being greater than the first preset duration ensures that effective data can be obtained within a specified preset duration.

In a possible implementation of the foregoing third aspect, the processing module is configured to obtain a communication count corresponding to the second moment and a current communication count, and obtain a communication count variation by subtracting the communication count corresponding to the second moment from the current communication count. Communication count records within the second preset duration are kept in the electronic apparatus, making the kept communication count records more representative. In addition, timely deletion of earlier records can reduce the memory consumption.

In a possible implementation of the foregoing third aspect, the processing module determines, based on at least one of ambient light data, touchscreen data, motion posture data, and user sleep data collected by sensors, and GPS data obtained by a communication unit, that the electronic device has entered the first mode.

In a possible implementation of the foregoing third aspect, the first mode includes a sleep mode, a low-power state, or a not-in-use state.

In a possible implementation of the foregoing third aspect, when the processing module receives user operation data, a network communication connection is enabled.

In a possible implementation of the foregoing third aspect, the user operation data includes at least one of operation data of tapping a touchscreen and operation data of a location change of the electronic apparatus.

According to a fourth aspect, this application provides a computer-readable storage medium, where the computer-readable storage medium stores a computer program, and when the computer program is run by a processor, the processor is enabled to perform the method according to the embodiment of the foregoing first aspect.

According to a fifth aspect, this application discloses a computer program product including instructions, where when the computer program product runs on a computer, the computer is enabled to perform the method according to the embodiment of the foregoing first aspect.

According to the system power consumption control method in the embodiments of this application, when an electronic device has entered a first mode, network communication of the electronic device is controlled based on a power change value and a communication count of background processes. In the method, when an electronic apparatus is in a not-in-use state, a sleep state, a low-power state, or the like, the communications of the background processes are controlled to prevent power of the electronic device from being rapidly consumed, thereby ensuring use time of the electronic device and further improving user experience. In addition, when user usage data is detected, the electronic device enables a network communication connection, thereby avoiding affecting normal usage by a user and further improving the user experience.

DETAILED DESCRIPTION OF ILLUSTRATIVE EMBODIMENTS

Figure 1:
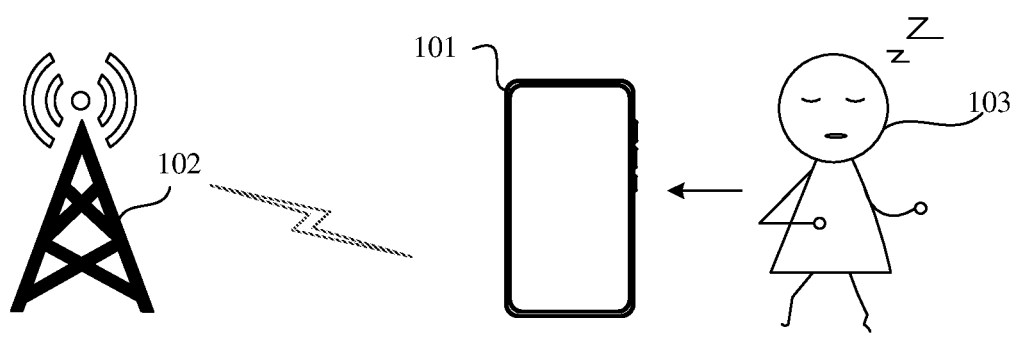
FIG. 1 is a scenario view of a mobile phone in an idle state according to an embodiment of this application.

The following clearly describes the technical solutions in the embodiments of this application with reference to the accompanying drawings in the embodiments of this application.

For ease of understanding, the following describes terms used in this application.

A first mode includes a sleep mode, a low-power state, or an idle state of an electronic device.

An idle state means that the electronic device is in a not-in-use state. The state may be determined by the electronic device with reference to user sleep data. For example, the electronic device obtains user sleep data, where the user sleep data may include data such as a heart rate or blood pressure; determines, based on the data, whether a user is in a sleep state; and when it is determined that the user is in the sleep state, determines that the electronic device is in an idle state. Alternatively, the electronic device obtains its state data, such as location data and screen off time of the electronic device, for determination. If the location data keeps unchanged within a preset time and the screen off time has reached a preset duration, the electronic device determines that the electronic device is in a not-in-use state. In addition, in some embodiments, the electronic device may alternatively determine that the user is probably in the sleep state based on sensor data for measuring mobility data, optical sensor, screen off time, current system time, and the like, indicating that a mobile phone is in the idle state.

Initial power is power of a battery obtained through initialization when the mobile phone enters the idle state.

A power loss amount is a difference obtained by subtracting current power from the initial power, or a difference obtained by sorting powers by acquisition time and subtracting current power from power corresponding to a start moment (second moment) of a preset time period (second preset duration). The initial power is power obtained at a first moment at which the electronic device enters the first mode, where the first moment is a moment at which the electronic device enters the first mode. The second moment is a start moment of the second preset duration, and the second preset duration is a duration within which power records are kept.

A communication count is a total communication count of all processes currently running in the background with other devices since power-on of the electronic device.

A communication count variation is an increment with respect to a communication count corresponding to the second moment within the second preset duration. To be specific, the communication count variation is obtained by subtracting the communication count corresponding to the second moment from a current communication count. The second moment (start moment) of the second preset duration may be the first moment at which the electronic device enters the first mode or a moment after the first moment.

The following describes the technical solutions of this application with reference to specific scenarios.

Referring to FIG. 1, FIG. 1 is a scenario view of a mobile phone in an idle state. The scenario view includes a mobile phone 101, a base station 102, and a user 103. The mobile phone 101 is communicating with the base station 102, and the user is in a sleep state. The mobile phone 101 obtains a specific amount of sleep data related to the user, such as a heart rate, blood pressure, a respiratory rate, and an eye movement speed. Such data may be obtained by a wearable device worn by the user, such as a watch, and the watch transmits such data to the mobile phone 101. The mobile phone determines that the user is in the sleep state based on such sleep-related data, that is, the mobile phone determines that the mobile phone is in the idle state. In this case, the mobile phone performs system initialization, and records system time at which the mobile phone enters the idle state, initial power of a battery corresponding to the system time, and a communication count of processes of application programs running in the background. After that, the mobile phone continuously obtains power of the battery and a communication count of applications or processes with the base station 102, and calculates a power loss amount (current power−initial power) based on the continuously obtained power of the battery (current power) and the power of the battery obtained when the mobile phone enters the idle state (initial power), or calculates a power loss amount by subtracting power obtained at a start moment of a preset time (second preset duration) from current power (current power−power obtained at a start moment of a preset time). When the power loss amount exceeds a preset power threshold of 10%, the mobile phone further determines whether a communication count of background processes exceeds a preset communication count of 50. When the communication count of background processes exceeds the preset communication count of 50, the mobile phone disables a network communication connection and disables the communication with the base station 102. In this way, when the user is in the sleep state (first mode), the communications of the background processes are blocked, preventing the power loss of the electronic device caused by the communications of the background processes from affecting user experience.

In some embodiments of this application, when the user sleep data is insufficient to determine that the user is in sleep, the mobile phone 101 may further determine whether the mobile phone is in the idle state based on data measured by the mobile phone for indicating whether the mobile phone is moving, intensity of received light, screen off time, and the like. This is an example for description of determining whether the mobile phone is in the idle state, and is not a limitation on this application.

It should be noted that application scenario of the technical solutions of this application is not limited to a scenario in which the user is in the sleep state, and may alternatively be a scenario in which power of the mobile phone is lower than a preset threshold, a scenario in which the mobile phone enters a sleep mode, a scenario in which the mobile phone is not used by the user, or the like. This is not limited herein.

In some embodiments of this application, the mobile phone may further determines, based on a power loss amount and a communication count within a first preset duration, whether to disable a network communication connection, that is, determines, based on a power loss speed and a communication frequency, whether to disable the network communication connection. For example, if within 20 minutes, the power loss amount exceeds 10% and the communication count of background processes reaches 50, the mobile phone 101 determines that the processes communicate frequently and power is rapidly consumed, and disables the network communication connection. This prevents the rapid power loss of the electronic device caused by the frequent communication of the background processes from affecting the user experience.

The foregoing description assumes that the electronic device is a mobile phone. However, the electronic device in this application may be a tablet computer, a notebook computer, an ultra-mobile personal computer, a personal digital assistant (personal digital assistant, PDA), a television, or a wearable electronic device such as a watch or a band. The electronic device is not limited to a specific type in this application.

The following describes in detail the technical solutions of this application with reference to the accompanying drawings.

Figure 2A:
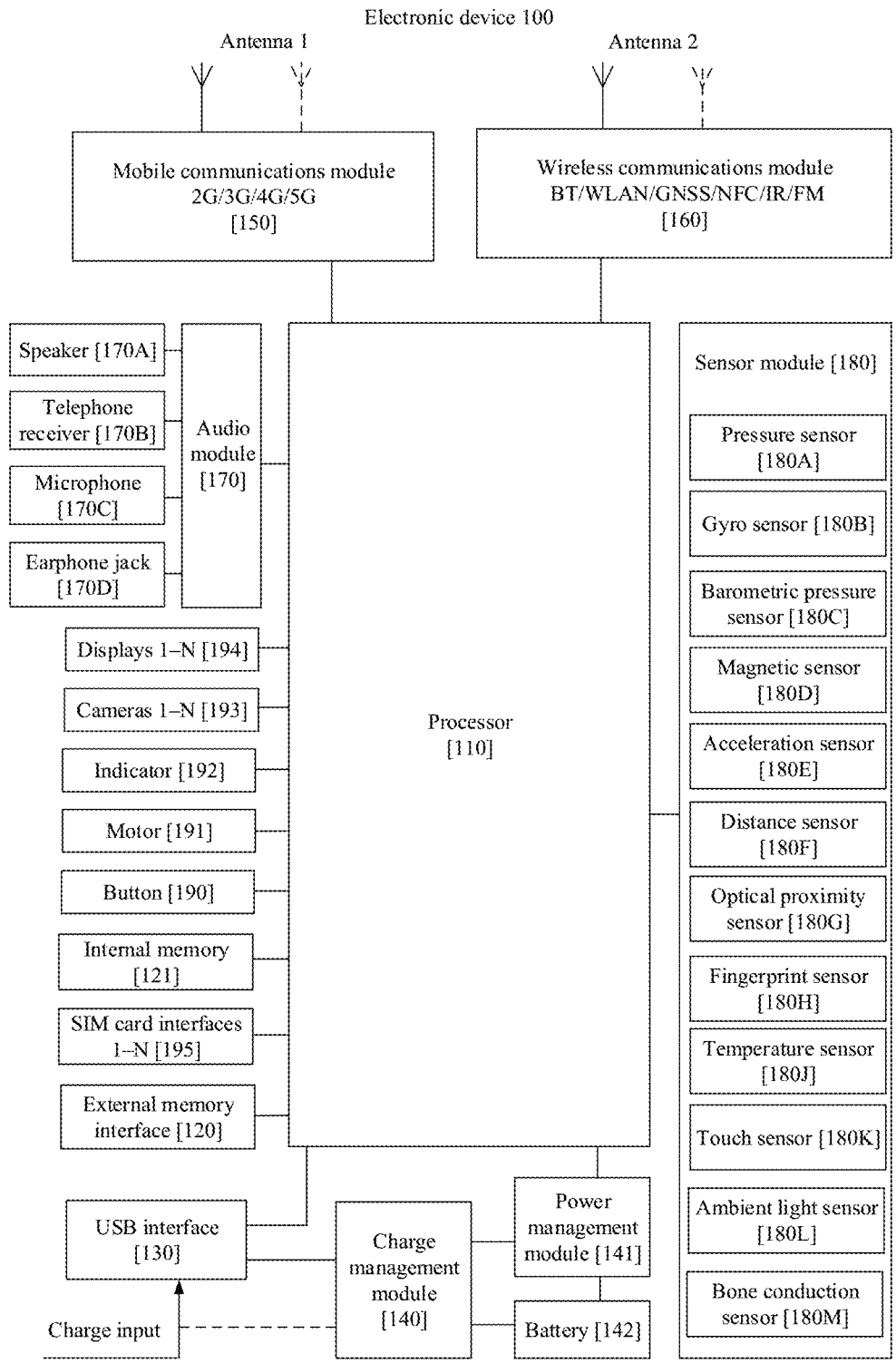
FIG. 2a is a schematic structural diagram of an electronic device according to an embodiment of this application.

For example, FIG. 2a a schematic structural diagram of an electronic device according to an embodiment of this application. The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of the present invention does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented in hardware, software, or a combination of software and hardware.

The processor 110 may generate an operation control signal according to an instruction operation code and a timing signal, to complete control of instruction fetch and instruction execution.

A memory may be further provided in the processor 110 to store instructions and data. In some embodiments, the memory in the processor 110 is a cache memory. The memory may store instructions or data that the processor 110 has just used or used repeatedly. If the processor 110 needs to use the instructions or data again, the processor 110 may invoke the instructions or data directly from the memory, thereby avoiding repeated access, reducing waiting time of the processor 110, and improving system efficiency.

In an embodiment of this application, when the processor 110 determines that the electronic device enters an idle state, the processor 110 performs initialization, and records initial power of the battery obtained when the electronic device enters the idle state and a communication count of application programs or processes running in the background during the initialization. After that, based on broadcast of Android, the processor 110 continuously obtains current power of the battery and a current communication count of the processes, and calculates a power loss amount (current power−initial power) based on the continuously obtained power of the battery (current power) and the power of the battery obtained when the electronic device enters a sleep state (initial power), or calculates a power loss amount by subtracting current power from power obtained at a start moment of a preset time (current power−power obtained at a start moment of a preset time). When the power loss amount exceeds a preset power threshold, for example, the power loss amount exceeds 10%, the processor 110 further determines whether a communication count of background processes exceeds a preset count, for example, 50. When the communication count of background processes exceeds 50, the processor 110 disables the network communication connection. Therefore, in the method, when the electronic device 100 is in the idle state or the like, the communications of the background processes can be blocked, preventing the power loss of the electronic device caused by the communications of the background processes from affecting user experience.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a bidirectional synchronous serial bus and includes a serial data line (serial data line, SDA) and a serial clock line (serial clock line, SCL). In some embodiments, the processor 110 may include multiple I2C buses. The processor 110 may be coupled to the touch sensor 180K, a charger, a flash, the camera 193, and the like by using different I2C bus interfaces. For example, the processor 110 may be coupled to the touch sensor 180K by using the I2C interface, so that the processor 110 and the touch sensor 180K communicate through the I2C bus interface to implement a touch function of the electronic device 100.

In some embodiments, touch information input by a user is received by the touch sensor 180K. The user sets a power management mode of the battery on a screen of the electronic device, for example, by tapping a Battery Manager application program on the screen. The touch sensor sends location coordinates information of the Battery Manager application program tapped by the user to the processor no, and the processor no determines, based on the location coordinates information, that the touch operation is to start the tapped Manager application program, and starts the Battery Manager application program. In this way, the user can implement various function requirements through touch operations.

The UART interface is a universal serial data bus used for asynchronous communication. The bus may be a bidirectional communications bus that switches transmission of to-be-transmitted data between serial communication and parallel communication. In some embodiments, the UART interface is generally configured to connect the processor 110 to the wireless communications module 160. In some embodiments, the processor 110 is connected to the wireless communications module 160 by using the UART interface to implement communication functions of a wireless network, such as Bluetooth communication and local area network communication.

The charge management module 140 is configured to receive a charge input from the charger. The charger may be a wireless charger or a wired charger. In some embodiments of wired charging, the charge management module 140 may receive a charge input from the wired charger by using the USB interface 130. In some embodiments, when charging the battery 142, the charge management module 140 may further monitor power of the battery by using the power management module 141.

The power management module 141 is configured to connect the battery 142, the charge management module 140, and the processor 110. The power management module 141 receives an input from the battery 142 and/or the charge management module 140, to supply power to the processor 110, the internal memory 121, the display 194, the wireless communications module 160, and the like. The power management module 141 may be further configured to monitor parameters such as a battery capacity, a quantity of battery cycles, and a state of health of the battery (leakage and impedance). In some embodiments, when the electronic device 100 is in the idle state, the power management module 141 may use a manner of periodic monitoring, for example, monitoring the power of the battery 142 every 30 seconds, to facilitate observation of power changes, and send the changes to the processor 110, so that the processor 110 determines, based on the power changes, whether to control the electronic device. In some embodiments, when determining that a power variation (power loss amount) is greater than a preset threshold, the processor 110 further determines whether the communication count of background processes exceeds a preset count. If the communication count of background processes exceeds the preset count, the processor 110 may disable the processes, or disable the communication connection from the mobile communications module and the wireless communications module, to disconnect the network of the electronic device 100, preventing rapid power consumption of the electronic device in a first mode, for example, the idle state, from affecting the user experience.

In some embodiments of this application, the processor 110 may obtain power data of the battery and communication count data from the power management module 141 by using a broadcast module, so that the processor 110 determines, based on the data, whether to control the power.

A wireless communication function of the electronic device 100 may be implemented by using the antenna 1, the antenna 2, the mobile communications module 150, the wireless communications module 160, a modem processor, a baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused to improve antenna utilization. For example, the antenna 1 may be reused as a diversity antenna of a wireless local area network. In some other embodiments, the antenna may be used in combination with a tuning switch.

The mobile communications module 150 may provide a wireless communications solution including 2G, 3G, 4G, or 5G for application to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and then the antenna 1 converts the signal into an electromagnetic wave for radiation. In some embodiments, each time the mobile communications module 150 receives a signal is recorded as one communication and each time the mobile communications module 150 transmits a signal is recorded as one communication, a count of signal receptions and transmissions (communication count) is calculated and sent to the processor 110, and the processor 110 determines, based on the communication count, whether to disconnect the network of the electronic device. In some embodiments of this application, the communication count may be obtained by the broadcast module of the processor 110.

The wireless communications module 160 may provide a wireless communications solution for application to the electronic device 100, including a wireless local area network (wireless local area networks, WLAN) (for example, a Wireless Fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), and an infrared technology (infrared, IR). The wireless communications module 160 may be one or more components integrating at least one communication processing module. The wireless communications module 160 receives an electromagnetic wave by using the antenna 2, performs frequency modulation and filtering processing on the electromagnetic wave signal, and sends the processed signal to the processor 110. The wireless communications module 160 may further receive a to-be-sent signal from the processor 110, and perform frequency modulation and amplification on the signal, and then the antenna 2 converts the signal into an electromagnetic wave for radiation. In an embodiment, each time the wireless communications module 160 receives an electromagnetic wave signal is recorded as one communication and each time the wireless communications module 160 transmits an electromagnetic wave signal is recorded as one communication, and a communication count recorded each time is sent to the processor 110. The processor 110 may determine, based on a mobile communication count and the communication count of the wireless communications module 160, whether to disable the network communication connection of the electronic device 100.

The electronic device 100 implements a display function by using a GPU, the display 194, an application processor, and the like. The GPU is a microprocessor used for image processing, and is connected to the display 194 and the application processor. The GPU is configured to perform mathematical and geometric calculation, and is used for graphics rendering. The processor 110 may include one or more GPUs, and the GPU executes a program instruction to generate or change display information.

The display 194 is configured to display an image, a video, and the like. The display 194 includes a display panel. In some embodiments, the display panel may display the power of the battery. The user may also select a battery power control mode by operating on the display 194. In some embodiments, the electronic device 100 may include one or N displays 194, where N is a positive integer greater than 1.

The internal memory 121 may be configured to store computer executable program code, where the executable program code includes an instruction. The internal memory 121 may include a program storage area and a data storage area. The program storage area may store an operating system, an application program required by at least one function (such as a sound playing function and an image playing function), and the like. The data storage area may store data (such as audio data and contacts) created during use of the electronic device 100, and the like. In addition, the internal memory 121 may include a high-speed random access memory, or may include a non-volatile memory such as at least one magnetic disk storage device, a flash memory device, and a universal flash storage (universal flash storage, UFS). By running the instructions stored in the internal memory 121 and/or the instructions stored in the memory that is provided in the processor, the processor 110 executes various functional applications and data processing of the electronic device 100.

In some embodiments, the data storage area of the memory 121 stores the data in a tabular form, such as a hash table. The hash table may record information such as the initial power of the battery obtained when the electronic device 100 enters the idle state and the communication count of background processes. The processor 110 may calculate the power loss amount of the electronic device in the idle state based on the data information in the hash table, and determine, in combination with the communication count, whether to control the network communications of the electronic device.

In some embodiments, the power management module 141 records power monitored each time and time corresponding to each power into the hash table. The processor 110 records a communication count obtained each time and a timestamp corresponding to the communication count into the hash table. The processor 110 may obtain the power loss amount based on the power recorded in the hash table, and when determining that the power loss amount has exceeded a preset threshold (condition a) and the communication count has exceeded a preset count (condition b), further determines, based on the timestamp, whether the condition a and the condition b hold within a preset duration. If the condition a and the condition b hold within the preset duration, the processor 110 disconnects the network of the electronic device. If the condition a and the condition b hold not within the preset duration, the records in the hash table are continued to be updated. When a quantity of records in the hash table exceeds a preset quantity, the processor 110 deletes power records or communication count records corresponding to earlier timestamps.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during photographing. In some embodiments, the gyro sensor 180B sends detected motion posture data to the processor 110, and the processor 110 determines a current motion state of a mobile phone based on the motion posture data.

The acceleration sensor 180E may detect magnitudes of accelerations of the electronic device 100 in all directions (usually three axes), may detect a magnitude and direction of gravity when the electronic device 100 is static, and may be further configured to recognize a posture of the electronic device, applied to applications such as a landscape/portrait mode switching and a pedometer. In some embodiments, the processor 110 may accurately determine whether the electronic device 100 is static or mobile with reference to the motion posture data of the electronic device 100 detected by the gyro sensor 180B and the magnitudes and variations of accelerations of the electronic device 100 in different directions detected by the acceleration sensor 180E.

The optical proximity sensor 180G may include, for example, a light-emitting diode (LED) and an optical detector, such as a photodiode. The light-emitting diode may be an infrared light-emitting diode. The electronic device 100 emits infrared light outward by using the light-emitting diode, and the electronic device 100 detects, by using the photodiode, infrared light reflected from nearby objects. When sufficient reflected light is detected, the electronic device 100 may determine that there is an object near the electronic device 100. When insufficient reflected light is detected, the electronic device 100 may determine that there is no object near the electronic device 100. In some embodiments, the electronic device 100 may enable, by using the reflected light detected by the optical proximity sensor 180G, the processor to determine whether the electronic device 100 is put in a backpack or a pocket, so as to determine whether the electronic device 100 is in the idle state currently. When determining that the electronic device 100 is in the idle state, the processor 110 obtains system time, the initial power of the battery, the communication count of background processes, and the like when the electronic device 100 enters the idle state, so that the processor 110 determines, based on such data and continuously obtained data, whether to control a network connection of the electronic device.

The ambient light sensor 180L is configured to sense brightness of ambient light. The electronic device 100 may adaptively adjust brightness of the display 194 based on the sensed brightness of the ambient light. The ambient light sensor 180L may also be configured to automatically adjust white balance during photographing. The ambient light sensor 180L may further cooperate with the optical proximity sensor 180G in detecting whether the electronic device 100 is in a backpack or a pocket or whether a current moment is at night.

In some embodiments, the ambient light sensor detects data such as intensity and brightness of current light, and the processor 110 may accurately determine that the current moment is at night based on the data such as the intensity and brightness of light and in combination with current system time.

In some embodiments, the processor 110 may determine whether the electronic device is in the idle state with reference to the mobility data detected by the gyro sensor 180B and the acceleration sensor 180E, the brightness and intensity data of light detected by the ambient light sensor 180L, and the system time. To be specific, when the mobility data keeps unchanged within a preset time, the brightness and intensity of light is brightness and intensity of light at night, a screen of the mobile phone is off within the preset time, and the system time is a preset night time, the processor 110 may determine that the mobile phone is in the idle state, and the idle state may indicate that the user is in a sleep state and the mobile phone is in a state of not being used by user. The processor 110 may periodically analyze and determine the power changes and the communication count to control the power when a preset condition is satisfied, so as to reduce excessive consumption of the power when the mobile phone is in the idle state.

The touch sensor 180K is also referred to as a "touch device". The touch sensor 180K may be disposed on the display 194, and the touch sensor 180K and the display 194 form a touchscreen, also referred to as a "touch screen". The touch sensor 180K is configured to detect a touch operation that acts on or near the touch sensor 180K. The touch sensor may transfer a detected touch operation to the application processor to determine a touch event type. A visual output related to the touch operation may be provided by using the display 194. In some embodiments, the touch sensor 180K may detect a touch operation of tapping the Battery Manager application program on the display 194 by the user, and send the touch event of the tapping to the processor 110. The processor 110 opens a screen of the Battery Manager application program or a power setting screen in a Settings program on the display 194 for the user, and the user may set parameter options of power information such as a preset threshold of power loss amount, a preset communication count, and a preset duration based on a screen prompt on the display 194.

The following describes the system power consumption control method in this application with reference to a software and hardware architecture diagram.

A software system of the electronic device 100 may use a layered architecture, an event-driven architecture, a micro-kernel architecture, a microservice architecture, or a cloud architecture. In this embodiment of the present invention, a software structure of the electronic device 100 is described by using an Android system with the layered architecture as an example.

Figure 2B:
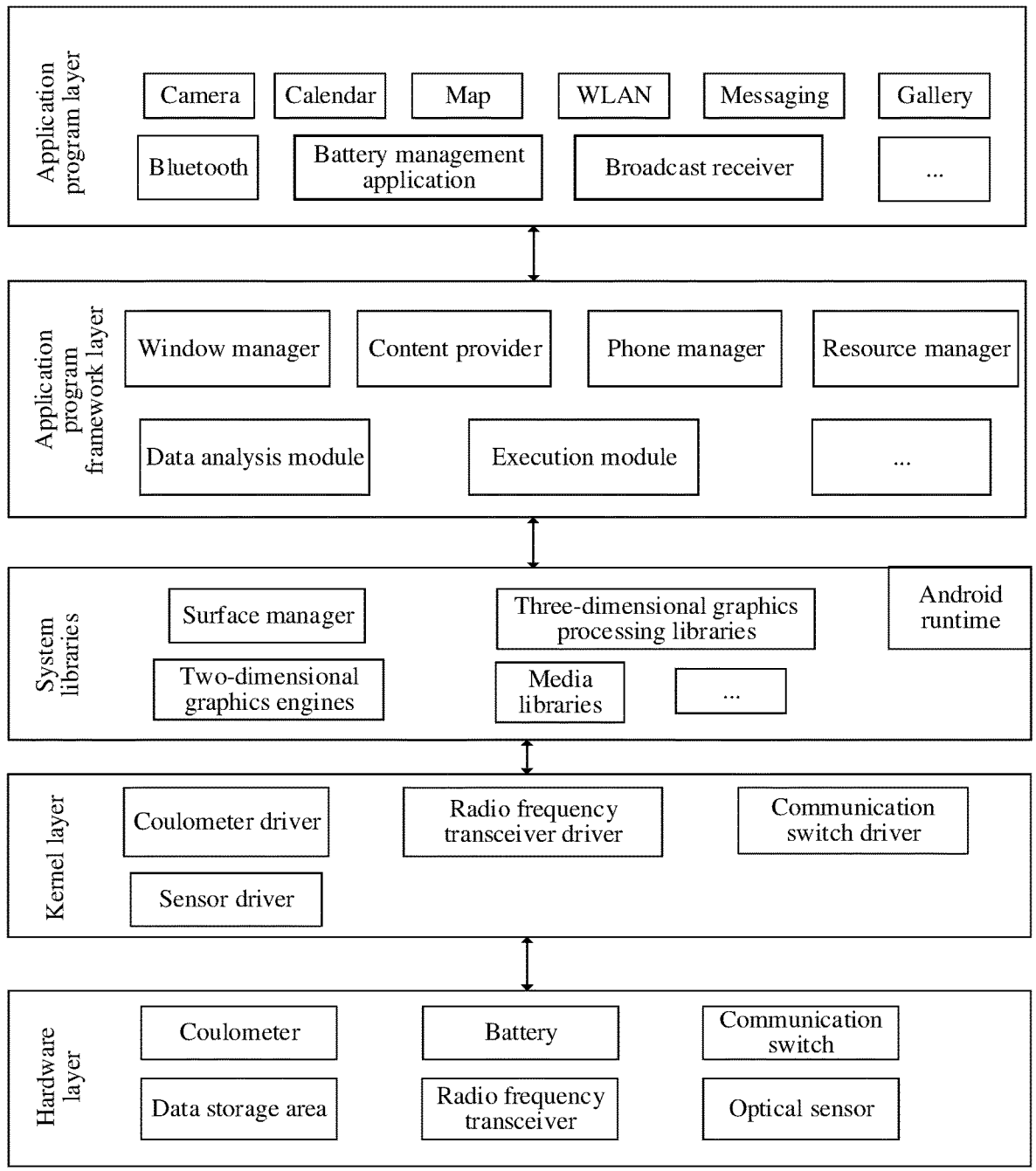
FIG. 2b is a diagram of a software architecture of an electronic device according to an embodiment of this application.

For example, FIG. 2b is an architecture diagram including a software structure and a hardware structure. As shown in FIG. 2b, an Android system is divided into four layers: an application program layer, an application program framework layer, Android runtime (Android runtime) and system libraries, and a kernel layer from top to bottom.

The application program layer may include a series of application program packages.

As shown in FIG. 2b, the application program packages may include Camera, Gallery, Calendar, Map, WLAN, Bluetooth, Messaging, Battery Manager, broadcast receiver, and the like.

The Battery Manager application is used to provide a channel for a user to input a preset parameter. The user may use the Battery Manager application to set various parameters related to power management, such as a preset threshold of power loss amount, a preset communication count of background processes, and a time parameter reflecting power consumption and communication frequency.

The broadcast receiver is used to respond to broadcast messages from other application programs or systems. For example, an application program registers the broadcast receiver in Android Manifest.xml to monitor power of a battery, a communication count of background processes, and the like.

The application program framework layer provides an application programming interface (application programming interface, API) and a programming framework for application programs at the application program layer. The application program framework layer includes some pre-defined functions.

As shown in FIG. 2b, the application program framework layer may include a window manager, a content provider, a phone manager, a resource manager, a data analysis module, an execution module, and the like.

The window manager is used to manage a window program. The window manager may obtain a size of a display, determine whether there is a status bar, lock a screen, take a screenshot, and the like.

The content provider is used to store and obtain data, and make the data accessible to the application programs. The data may include a video, an image, an audio, calls made and answered, browse history and favorites, contacts, and the like.

The phone manager is used to provide a communication function of the electronic device 100, for example, management of a call status (including answering and disconnected).

The resource manager provides various resources for the application programs, such as a localized character string, an icon, a picture, a layout file, and a video file.

In an embodiment of this application, the data analysis module is configured to analyze, based on various parameter information related to power consumption, whether to control power consumption of the electronic device currently.

The execution module is configured to control, based on an instruction of the data analysis module, hardware at a hardware layer to execute a corresponding action, for example, disabling communication, to control power consumption of the electronic device caused by communications.

As shown in FIG. 2b, the kernel layer is a layer between the hardware and software. The kernel layer may include a sensor driver, a coulometer driver, a radio frequency transceiver driver, and a communication switch driver, and the drivers are used as a communication bridge between a software module and the hardware to implement communication between the software and hardware. The coulometer driver is configured to drive a coulometer to monitor the power of the battery and send a monitoring result to the system, and the system broadcasts the result, such that the broadcast receiver obtains a corresponding power of the battery. The radio frequency transceiver driver is used to drive a radio frequency transceiver to calculate the communication count and send the result to the system, and the system broadcasts the result, such that the broadcast receiver obtains a corresponding communication count of processes.

The hardware layer includes the hardware executing various instructions. As shown in FIG. 2b, the hardware layer may include a data storage area, a coulometer, the battery, the radio frequency transceiver, the communication switch, and an optical sensor.

The optical sensor is configured to obtain data related to external light. The optical sensor may include the ambient light sensor and the optical proximity sensor shown in FIG. 1. The ambient light sensor may obtain light brightness, light intensity, and the like in an environment, and the optical proximity sensor may obtain data of infrared light reflected from surrounding objects. The optical sensor obtains the data related to external light, and sends the data to the data analysis module by using the sensor driver. The data analysis module analyzes the data to determine whether the electronic device is currently at night or in a backpack (it is generally acknowledged that within a time period during which the user does not use the electronic device, the electronic device is in an idle state).

When the data analysis module determines that the electronic device is in the idle state, the data analysis module sends an instruction of monitoring the power consumption of the electronic device to the execution module, and the execution module enables, according to the instruction, the coulometer through the coulometer driver to monitor the power of the battery. The execution module enables, through the radio frequency transceiver driver, the radio frequency transceiver to record the communication count. The data is obtained at the hardware layer, written to a device node through a corresponding driver (written to a specified file in the memory), and obtained by the broadcast receiver at the application program layer by system broadcasting. How the broadcast receiver receives data at the hardware layer is described by using power data as an example. For upper-layer Android package kits (Android Package kits, APK), Android intent action battery-changed (android intent action Battery-changed) broadcast needs to be registered. When the power changes, the framework layer traverses all broadcast receivers having registered the broadcast, and the system broadcasts power change information to all the broadcast receivers having registered the broadcast, so that the power is received. In addition, in this application, other data such as location data, screen off time, and system time may also be obtained by using the broadcast receiver. Such data is collected by corresponding sensors at the hardware layer, and the sensors convert analog signals into digital signals and write the digital signals to the device node by using the corresponding drivers. Such data is sent to the broadcast receivers having registered the Android broadcast by using the Android broadcast. In this way, a process of data from a bottom layer to an application layer is implemented.

An shown in FIG. 2b, when obtaining system time, initial power, and continuously monitored current power, the coulometer stores such data in the data storage area in a tabular form, and the radio frequency transceiver stores the obtained communication count into a corresponding recording table. The foregoing data may be stored in the data storage area in a form of a hash table for a quick query.

The broadcast receiver sends the received current power and current communication count to the data analysis module. The data analysis module calculates the power loss amount based on the received current power and the initial power stored in the data storage area, or power corresponding to a start moment of a preset time, and compares the power loss amount with a preset threshold (which may be obtained from the Battery Manager application or be a system default value). When the power loss amount is greater than the preset threshold, for example, 10%, the data analysis module further determines whether the current communication count is greater than or equal to a preset count (which may be obtained from the Battery Manager application or be a system default value). If the current communication count is greater than or equal to the preset count, the data analysis module sends a control instruction to the execution module, for example, an instruction of disabling a network. The execution module executes the instruction and disables the communication by using a communication switch driver, that is, disconnects the network of the electronic device, such that the radio frequency transceiver stops receiving and sending signals. In this way, when a mobile phone is in the idle state (that is, when the user does not use the electronic device), the power consumption of the battery is reduced, thereby improving user experience.

The following describes the system power consumption control method in this embodiment of this application with reference to specific embodiments.

The system power consumption control method in this application may be applied to the electronic device described in FIG. 2a and FIG. 2b. The following embodiments assume that the electronic device is a mobile phone.

Figure 3:
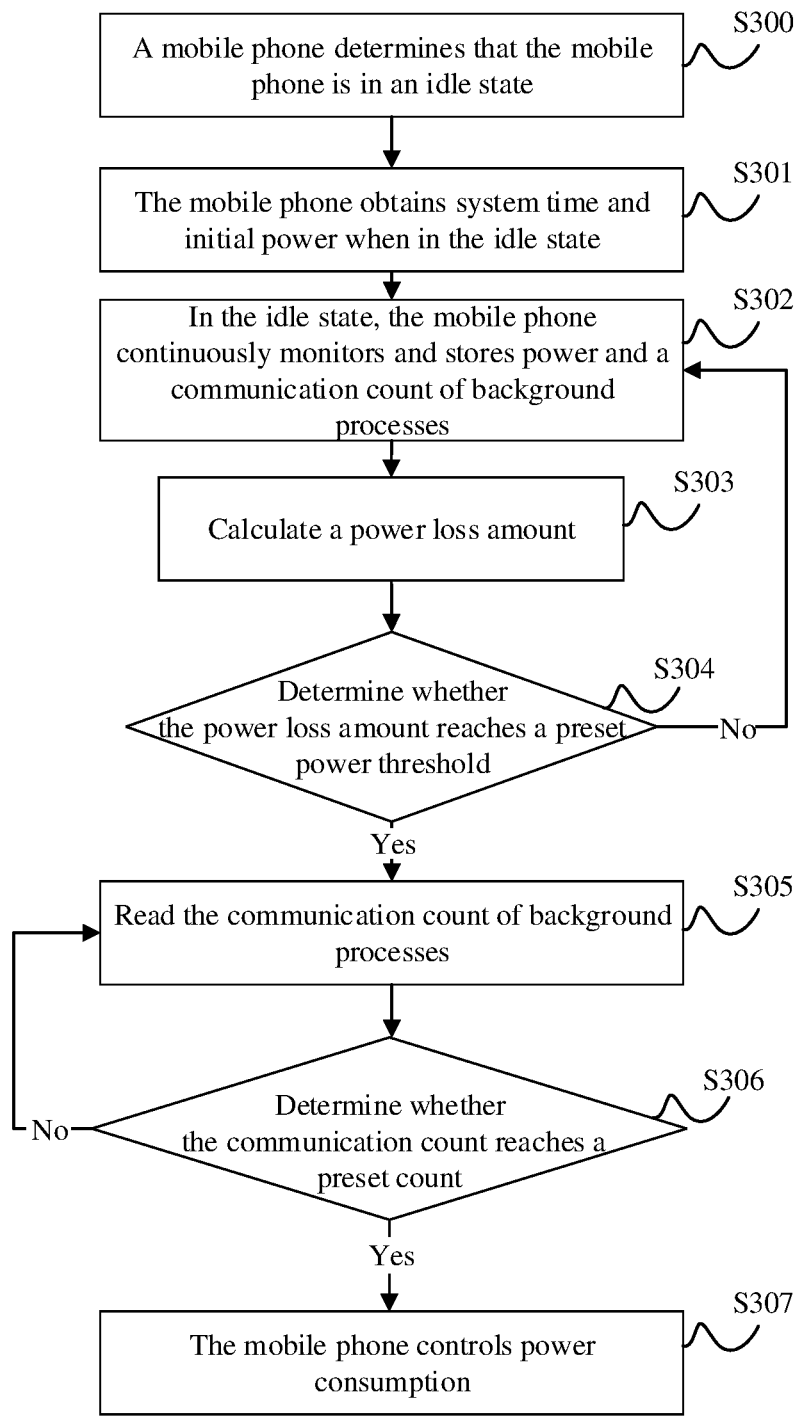
FIG. 3 is a flowchart of a system power consumption control method according to an embodiment of this application.

Referring to FIG. 3, FIG. 3 shows an example of a flowchart of a system power consumption control method. As shown in FIG. 3, the flowchart includes S300 to S308.

In S300, a mobile phone determines that the mobile phone is in an idle state.

In an embodiment of this application, the idle state may be determined in one or more of the following manners.

In a first manner, the mobile phone may determine whether it is currently at night by using its ambient light sensor and optical proximity sensor to detect light brightness, light intensity, reflected infrared light, and the like parameters. The step is performed by the ambient light sensor, the optical proximity sensor, and the processor in FIG. 1. If at night, the mobile phone further determines whether screen off time of the mobile phone exceeds a preset time, for example, exceeds 1 minute. If the screen off time of the mobile phone exceeds the preset time, the mobile phone determines that the mobile phone is in the idle state.

In a second manner, the mobile phone may determine whether the mobile phone is currently at night by using system time. For example, when the system time is 10:00 PM, it is a night time. In addition, the mobile phone may determine whether the mobile phone is currently at night based on a mode set by a user. For example, the mobile phone supports a night mode and a daytime mode, and when the user sets the mobile phone to the night mode, the mobile phone determines that the mobile phone is currently at night. The mobile phone further determines whether the screen off time of the mobile phone exceeds a preset time, for example, exceeds 1 minute. If the screen off time of the mobile phone exceeds the preset time, the mobile phone determines that the mobile phone is in the idle state.

In a third manner, the mobile phone may perform determination with reference to user data. For example, a watch worn by the user monitors data such as a heart rate or blood pressure of the user, and the mobile phone determines that the user is in a sleep state based on such user data, and therefore determines that the mobile phone is currently in the idle state. The user data may be used for determining at any time whether the user is in sleep, and predicting whether the mobile phone is in the idle state.

In some embodiments of this application, the mobile phone may determine whether it is in the idle state with reference to a plurality of data in the three manners, so as to improve accuracy of the determining. Herein, the descriptions are only exemplary, and whether the mobile phone is in the idle state may also be determined based on other data, for example, whether the mobile phone is being charged. This is not limited herein.

The foregoing description assumes that a first mode of the mobile phone is the idle state. In some embodiments of this application, the first mode may alternatively be a low-power mode, a sleep mode, or the like. This is not limited herein.

S301. The mobile phone obtains system time and initial power when entering the idle state.

When the mobile phone enters the idle state, that is, at an occasion for determining whether to perform power control, the mobile phone obtains the system time and the initial power by performing system initialization, and stores the data in an internal memory as an original record.

S302. When in the idle state, the mobile phone continuously monitors power and a communication count of background processes, and stores the power and communication count obtained each time. For example, information such as the power, the system time, and the communication count may be broadcast by using a system broadcast, and a broadcast receiver monitors and obtains the power, the system time, the communication count, and the like, so that other programs of the mobile phone can further analyze and process the data.

In the embodiments of this application, the communication count is a total communication count of all processes in the background with the outside. The data is stored in a form of a hash table, allowing the mobile phone to quickly obtain specified data in the table. When the data in the hash table exceeds a preset value, previous power records in time order are deleted.

In some embodiments of this application, the mobile phone may also assign a mark to each process in the background and determine a communication count of the process based on the mark. A communication process of each process is separately recorded, so as to control communication of the individual process.

S303. The mobile phone calculates a power loss amount.

In the embodiments of this application, the mobile phone obtains the power loss amount by subtracting current power from the initial power. Alternatively, the mobile phone may subtract the current power from power at a start moment in the recording table, so as to remove power with a low reference value in a timely manner to release memory.

Figure 4:
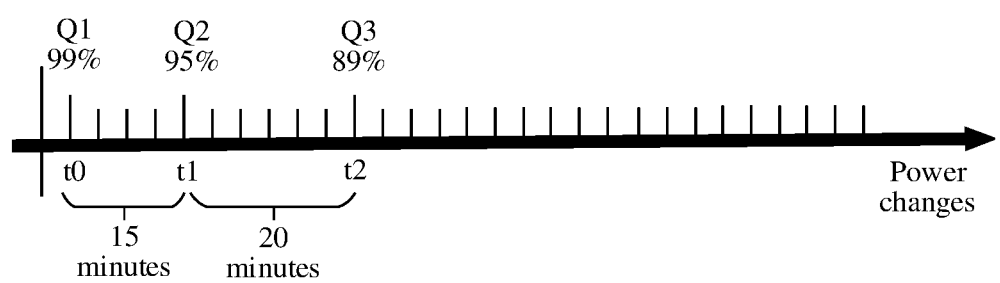
FIG. 4 is a diagram of power changes according to an embodiment of this application.

FIG. 4 is a diagram of power changes. As shown in FIG. 4, initial power Q1 is 99%, power Q2 obtained at time t1 is 95%, and then a power loss amount at the time t1 is Q1-Q2, that is, in an interval of 15 minutes from t0 to t1, the power loss amount is 99%-95%=4%. Power Q3 obtained at time t2 is 89%. A power loss amount at time t2 is Q1-Q3, that is, in an interval of 20 minutes from t1 to t2, the power loss amount is 99%–89%=10%. In this application, when power is obtained by system broadcast, that is, the power is obtained when the power changes, time intervals of obtaining every two powers are unnecessarily the same. For example, a time interval from t0 to t1 is 15 minutes, while a time interval from t1 to t2 is 20 minutes. If the power is monitored periodically, the time interval may be set to a fixed value, for example, 15 minutes.

S304. The mobile phone determines whether the power loss amount has reached a preset threshold. For example, as shown in FIG. 4, if the preset threshold is 10%, and current power is 95%, the power loss amount is 4%, which does not reach 10%. Therefore, the mobile phone performs S302 again.

If the current power is 89%, the power loss amount is 10%, which has reached the preset threshold of 10%, and the mobile phone performs S305, that is, read a communication count of background processes. The communication count is a total communication count of all processes in the background of the mobile phone.

S306. The mobile phone determines whether the communication count has reached a preset communication count.

In an embodiment of this application, the communication count is a total communication count of all processes running in the background of the mobile phone at a current moment with other devices from a moment at which the mobile phone is powered on.

For example, the preset count is 50. A current communication count of background processes is 40, which does not reach the preset count, and the mobile phone still performs S305. The communication count may be a total communication count of processes running in the background.

If the current communication count of background processes is 60, which exceeds the preset count of 50, the mobile phone performs S307, that is, the mobile phone controls power consumption. For example, the mobile phone disables a network communication connection by controlling a network communication switch.

The system power consumption control method according to the embodiments of this application can prevent power consumption caused by frequent communication of background processes of the mobile phone when the mobile phone is in an idle state (not being used by a user) from affecting user experience.

In some embodiments, a communication count of each process running in the background may also be limited. For example, the communication count of each process in the background is separately calculated. For example, the process reads data in a device node by invoking an upper layer interface, and obtains its own data such as power and a communication count. When a communication count of one process reaches a preset value, for example, 20, the mobile phone may separately manage the process, for example, disable the process.

In another embodiment of this application, a power loss speed and a communication frequency may also be limited, to avoid rapid power consumption in a short time. To be specific, a power loss amount and a communication count in a preset time are used as determining conditions.

Figure 5:
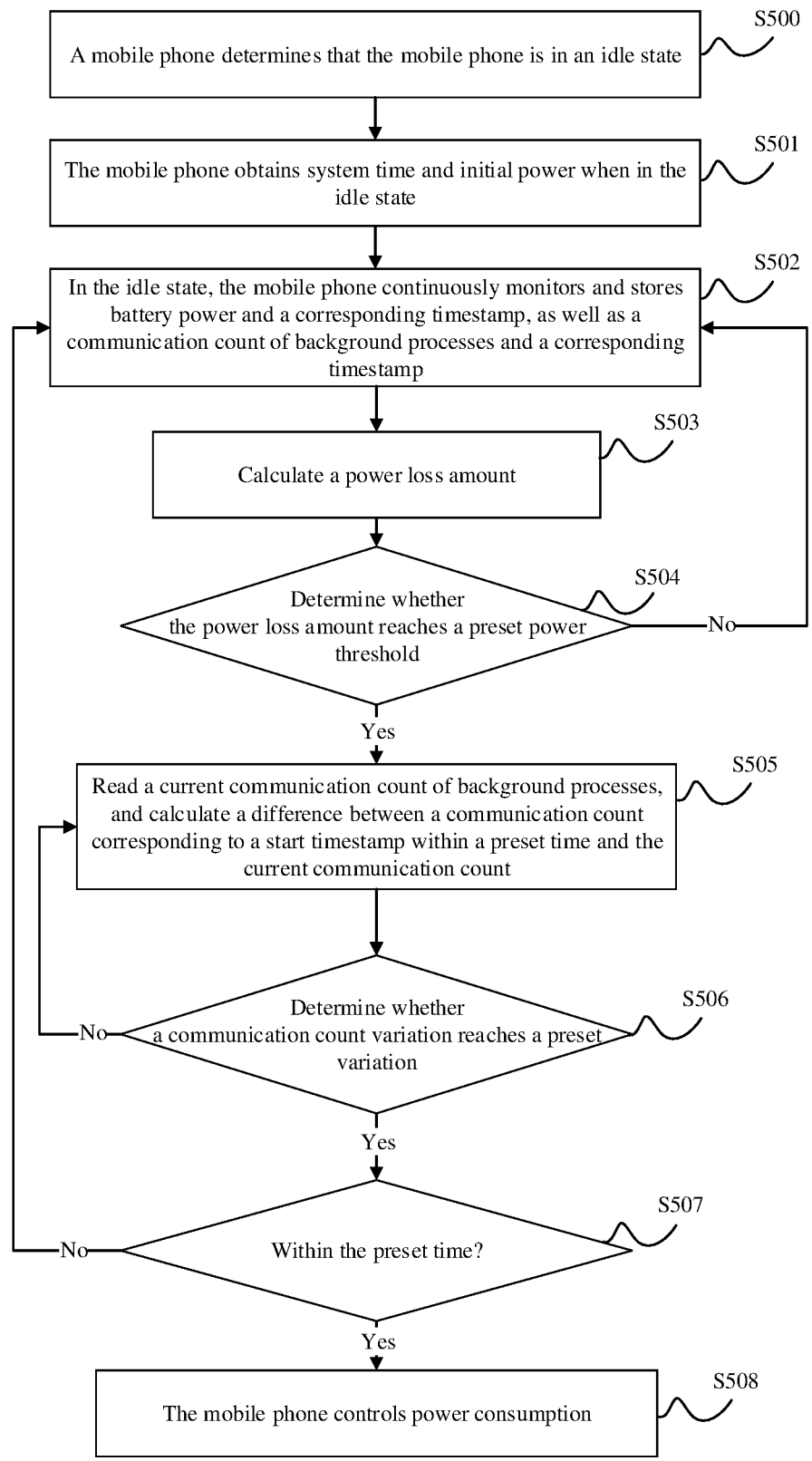
FIG. 5 is another flowchart of a system power consumption control method according to an embodiment of this application.

Referring to FIG. 5, FIG. 5 shows an example of another flowchart of a system power consumption control method. The method may be executed by a mobile phone with the structure shown in FIG. 1 and FIG. 2. As shown in FIG. 5, the flowchart includes S500 to S508.

S500 and S501 are the same as S300 and S301 in FIG. 3, and S503 and S504 are the same as S303 and S304 in FIG. 3. For details, refer to the description in the foregoing embodiments, which are not described herein again.

In S502, when in an idle state, the mobile phone continuously monitors and stores power of a battery and a corresponding timestamp, as well as a communication count of background processes and a corresponding timestamp. When periodically detecting the power of the battery, the mobile phone also records a timestamp corresponding to each power record. When recording the communication count each time, the mobile phone also records a timestamp corresponding to the communication count.

In S505, a current communication count of background processes is read, and a difference (a communication count variation) between a communication count corresponding to a start moment of a preset duration (a second preset duration) and the current communication count is obtained. For example, a communication count of processes corresponding to the start moment within the second preset duration, for example, within 20 minutes, obtained from records is 20, a communication count obtained at a current moment is 80, and then the communication count variation is 60. Setting the second preset duration can avoid that previously obtained records are of little reference value due to excessively long time. Therefore, setting of the preset duration and periodic deletion of earlier records allows the electronic device to determine power consumption more reliably.

In S506, the mobile phone determines whether the communication count variation has reached a preset variation. For example, if the preset variation is 50, and the communication count variation is 60, which is greater than 50, S507 is performed. If the communication count variation does not reach the preset variation, the mobile phone performs S505.

In S507, the mobile phone determines whether a power loss amount has reached a preset power threshold and the communication count variation has reached a preset variation within a preset duration (a first preset duration). For example, the first preset duration is 10 minutes. Then if within 10 minutes, the power loss amount has reached a preset threshold of 10% and the communication count has reached a preset count of 50, the mobile phone performs S508, that is, the mobile phone controls power consumption. In the method, the mobile phone determines whether the power loss amount has reached the preset threshold and whether the communication count variation has reached the preset variation within the preset duration. This can effectively prevent excessive power consumption in a short time due to fast power consumption of the mobile phone. Therefore, when the power loss amount increases sharply within a short time, the mobile phone needs to be controlled in a timely manner. For example, the network communication connection of the mobile phone is disabled by controlling a communication switch. Determining with reference to the three factors allows power control to be performed more accurately, avoiding bringing inconvenience to a user due to network disconnection.

It should be noted that in determining the power loss amount and the communication count variation, the specified first preset duration should be less than the second preset duration within which the power records and the communication count records are kept, such that in S507, there are power records and communication count records within a sufficient duration to ensure accuracy of the determining.

When in S507, a determining result is no, that is, the power loss amount does not reach the preset threshold and the communication count variation does not reach the preset variation within the preset duration, the mobile phone performs S502 again.

According to the system power consumption control method in this embodiment of this application, when the mobile phone is in a not-in-use state, a sleep state, or a low-power state, the mobile phone can control communications of background processes to prevent power of the electronic device from being rapidly consumed, thereby ensuring use time of the electronic device and further improving user experience.

In the embodiments of this application, when a user operation is detected, such as a screen being lit up after a tap or a motion, the mobile phone determines that the mobile phone is currently in a state of being used by the user, and restores the network, so that the user can normally use the network, improving the user experience.

In some embodiments of this application, the parameters such as the preset threshold, preset count, and preset duration mentioned in FIG. 3 and FIG. 5 may be system default values or may be set by the user based on requirements.

Figure 6:
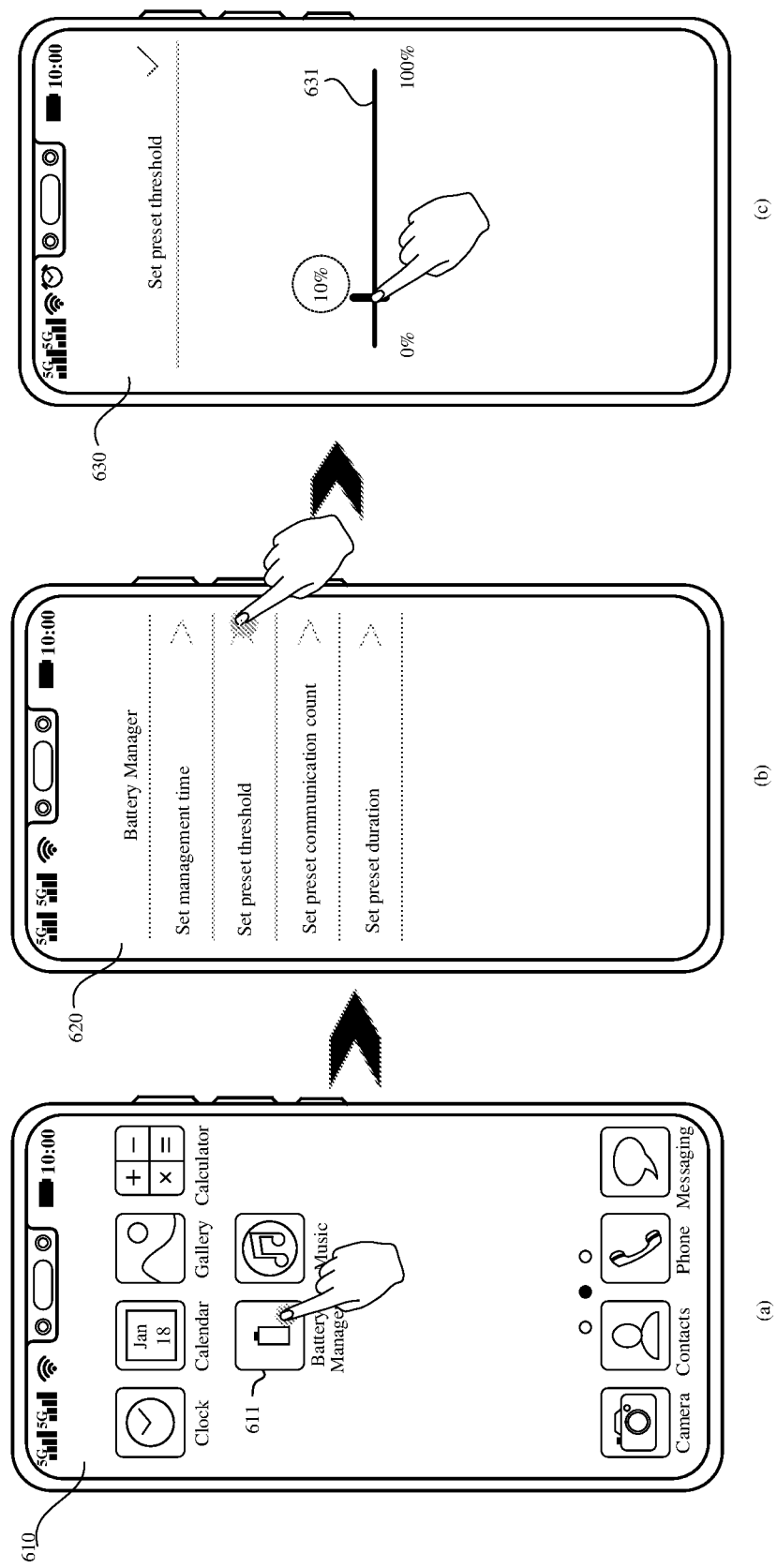
FIG. 6 is a schematic diagram of screen operations of a mobile phone according to an embodiment of this application.

Referring to FIG. 6, FIG. 6 shows an example of a schematic diagram of screen operations of a mobile phone. As shown in FIG. 6(a), a Battery Manager icon 611 is displayed on a screen 610. A user may tap the icon 611 and set parameters, such as a preset threshold of power loss amount and a preset communication count. When the user taps the icon 611, a user settings screen is displayed. As shown in FIG. 6(b), a screen 620 is the user settings screen. The screen 620 includes options for parameter setting, and the user sets the parameters, such as "Set management time", "Set preset threshold", "Set preset communication count", and "Set preset duration". When the user taps the Set preset threshold, as shown in FIG. 6(c), a screen 630 is displayed. The screen 630 includes a scale 631 for setting the preset threshold of power loss amount, and the user may select a parameter value of the preset power threshold by using the scale 631. In addition, the user may also set a time period requiring management through the Set management time on the screen 620, for example, from 10:00 PM to 5:00 AM. The user may also set the preset communication count, a preset variation, or the like through the option Set preset communication count, and set a first preset duration through the option Set preset duration. This application uses user-defined settings, allowing more flexible use by the user. Different users can select appropriate parameters based on different requirements, helping improve user experience.

An embodiment of this application further provides an electronic apparatus, and the electronic apparatus may be configured to implement the functions executed by the electronic device in the power consumption control method in the foregoing embodiments. The functions of the electronic device may be implemented by hardware, or may be implemented by hardware executing corresponding software. The hardware or software includes one or more modules or units corresponding to the foregoing functions.

Figure 7:
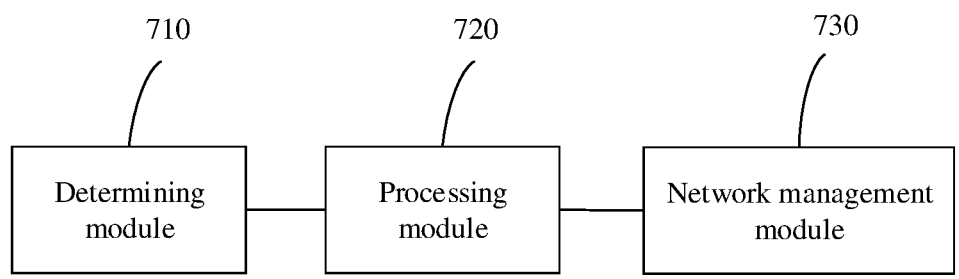
FIG. 7 is a schematic structural diagram of an electronic apparatus according to an embodiment of this application.

For example, FIG. 7 is a schematic structural diagram of an electronic apparatus according to an embodiment of this application. As shown in FIG. 7, the electronic device may include a determining module 710, a processing module 720, and a network management module 730.

The determining module 710 is configured to determine that the electronic device has entered a first mode.

The processing module 720 is configured to determine a power loss amount of a battery and a communication count of background processes, where the power loss amount is a decrease of power with respect to power at a first moment, the first moment is a moment at which the electronic apparatus enters the first mode, and the communication count is used for indicating a total communication count of all processes currently running in the background with other devices since power-on of the electronic device.

The network management module 730 is configured to: when the power loss amount reaches a preset power threshold and the communication count reaches a preset communication count, disable a network communication connection.

The specific embodiments executed by the modules are described in the methods in FIG. 3 and FIG. 5. For details, refer to the description of the methods, which are not described herein again. Corresponding technical effects are achieved, that is, when the electronic apparatus is in a not-in-use state, a sleep state, a low-power state, or the like, the electronic apparatus can control the communications of the background processes to prevent power of the electronic apparatus from being rapidly consumed, ensuring use time of the electronic apparatus and further improving user experience.

Figure 8:
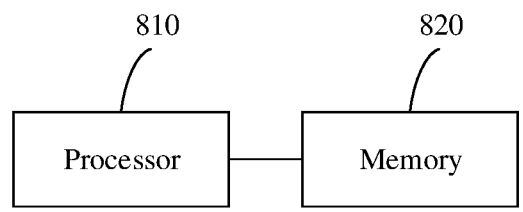
FIG. 8 is a schematic structural diagram of an electronic device according to an embodiment of this application.

Referring to FIG. 8, this application further provides an electronic device, including:

a memory 810, configured to store instructions to be executed by one or more processors of the device; and a processor 820, configured to execute the methods in the foregoing embodiments with reference to FIG. 3 and FIG. 5.

The specific embodiments executed by the components are described in the methods in FIG. 3 and FIG. 5, and corresponding technical effects are achieved. For details, refer to the description of the methods, which are not described herein again.

This application further provides a computer-readable storage medium, where the computer-readable storage medium stores a computer program, and when the computer program runs on an electronic device, the electronic device is enabled to implement the power consumption control methods shown in FIG. 3 and FIG. 5 in the foregoing embodiments.

Optionally, this embodiment of this application may be implemented as an instruction born by or stored on one or more transitory or non-transitory machine-readable (for example, computer-readable) storage media, and the instruction may be read or executed by one or more processors. For example, the instruction may be distributed through a network or other computer-readable media. Therefore, the machine-readable medium may include any mechanism used for storing or transmitting information in a machine (for example, computer) readable form, including but not limited to a floppy disk, an optical disc, an optical disk, a compact disc read-only memory (Compact Disc Read Only Memory, CD-ROMs), a magnetic optical disc, a read-only memory (Read Only Memory, ROM), a random access memory (RAM), an erasable programmable read-only memory (Erasable Programmable Read Only Memory, EPROM), an electrically erasable programmable read-only memory (Electrically Erasable Programmable Read Only Memory, EEPROM), a magnetic card or an optical card, a flash memory, or a tangible machine-readable memory used for transmitting information (such as a carrier, an infrared signal, and a digital signal) by using electricity, light, sound, or propagation signals in other forms over the Internet. Therefore, the machine-readable medium includes any type of a machine-readable medium suitable for storing or transmitting an electronic instruction or information in the machine (for example, computer) readable form.

This application further provides a computer program product including instructions, where when the computer program product runs on an electronic device, the electronic device is enabled to perform the power consumption control methods shown in FIG. 3 and FIG. 5 in the foregoing embodiments.

The specific embodiments executed by the program product are described in the methods in FIG. 3 and FIG. 5, and corresponding technical effects are achieved. For details, refer to the description of the methods, which are not described herein again.

It should be noted that in the embodiments and specification of this patent, relational terms such as first and second are only used to distinguish one entity or operation from another entity or operation, and do not necessarily require or imply that there is any such actual relationship or sequence between these entities or operations. Terms "comprise", "include", or any other variations thereof are intended to cover a non-exclusive inclusion, such that a process, a method, an article or a device including a list of elements not only includes those elements but also includes other elements that are not expressly listed, or further includes elements inherent to such process, method, article or device. In absence of more constraints, an element preceded by the statement "includes a . . . " does not preclude existence of identical elements in the process, method, article, or device that includes the element.

Although this application has been illustrated or described with reference to some preferred embodiments of this application, persons of ordinary skill in the art should understand that various modifications can be made to forms and details of the embodiments without departing from the spirit and scope of this application.

What is claimed is:

1. A system power consumption control method, comprising:
   determining, by an electronic device, that the electronic device has entered a first mode, wherein the first mode comprises a sleep mode, a low-power state, or an idle state of the electronic device;
   determining, by the electronic device, a first power loss amount of a battery and a first communication count of background processes, wherein the first power loss amount is a decrease of power with respect to power at a first moment, the first moment is a moment at which the electronic device enters the first mode, and the first communication count is used for indicating a total communication count of all processes currently running in the background with other devices since power-on of the electronic device;
   obtaining, by the electronic device, power of the battery corresponding to a second moment and current power of the battery corresponding to a current moment, wherein the second moment is a start moment of a second preset duration, and the second preset duration is a duration within which power records are kept;
   obtaining, by the electronic device, a second power loss amount corresponding to the current moment by subtracting the current power of the battery from the power of the battery corresponding to the second moment, wherein the second preset duration is greater than a first preset duration;
   obtaining a communication count corresponding to the second moment and a current communication count corresponding to the current moment;
   obtaining a communication count variation by subtracting the communication count corresponding to the second moment from the current communication count; and
   in response to the electronic device determining that within the first preset duration, the second power loss amount has reached a preset power threshold and the communication count variation has reached a preset variation, disabling, by the electronic device, a network communication connection of the electronic device.

2. The system power consumption control method of claim 1, wherein the determining, by the electronic device, the first power loss amount of the battery comprises:
   obtaining, by the electronic device, initial power of the battery corresponding to the first moment and a power of the battery at a third moment; and
   obtaining, by the electronic device, a power loss amount corresponding to the third moment by subtracting the power of the battery at the third moment from the initial power.

3. The system power consumption control method of claim 1, wherein determining that the electronic device has entered the first mode comprises:
   determining, by the electronic device based on at least one of ambient light data, touchscreen data, motion posture data of the electronic device, GPS data, and user sleep data, that the electronic device has entered the first mode.

4. The system power consumption control method of claim 1, wherein when the electronic device receives user operation data, the network communication connection is enabled.

5. The system power consumption control method of claim 4, wherein the user operation data comprises at least one of operation data of tapping a touchscreen and operation data of a location change obtained by the electronic device.

6. An electronic device, comprising:
   one or more processors; and
   one or more storage devices storing instructions that are operable, when executed by the one or more processors to perform operations comprising:
   determining that the electronic device has entered a first mode, wherein the first mode comprises a sleep mode, a low-power state, or an idle state of the electronic device;
   determining a first power loss amount of a battery and a first communication count of background processes, wherein the first power loss amount is a decrease of power with respect to power at a first moment, the first moment is a moment at which the electronic device enters the first mode, and the first communication count is used for indicating a total communication count of all processes currently running in the background with other devices since power-on of the electronic device;
   obtaining power of the battery corresponding to a second moment and current power of the battery corresponding to a current moment, wherein the second moment is a start moment of a second preset duration, and the second preset duration is a duration within which power records are kept;

obtaining a second power loss amount corresponding to the current moment by subtracting the current power of the battery from the power of the battery corresponding to the second moment, wherein the second preset duration is greater than a first preset duration;

obtaining a communication count corresponding to the second moment and a current communication count corresponding to the current moment;

obtaining a communication count variation by subtracting the communication count corresponding to the second moment from the current communication count; and in response to determining that within the first preset duration, the second power loss amount has reached a preset power threshold and the communication count variation has reached a preset variation, disabling a network communication connection.

7. The electronic device of claim 6, wherein determining the first power loss amount of the battery comprises:

obtaining initial power of the battery corresponding to the first moment and power of the battery at a third moment; and obtaining the first power loss amount corresponding to the third moment by subtracting the power of the battery at the third moment from the initial power.

8. The electronic device of claim 6, wherein determining that the electronic device has entered the first mode comprises:

determining, based on at least one of ambient light data, touchscreen data, motion posture data of the electronic device, GPS data, and user sleep data, that the electronic device has entered the first mode.

9. The electronic device of claim 6, the operations further comprising:

when the one or more processors receives user operation data, enabling the network communication connection.

10. The electronic device of claim 9, wherein the user operation data comprises of operation data of tapping a touchscreen.

11. The electronic device of claim 9, wherein the user operation data comprises operation data of a location change of the electronic device.

12. A non-transitory computer-readable storage medium, wherein the non-transitory computer-readable storage medium stores instructions that are operable, when executed by one or more processors, to cause the one or more processors to perform operations comprising:

determining that an electronic device has entered a first mode, wherein the first mode comprises a sleep mode, a low-power state, or an idle state of the electronic device;

determining a first power loss amount of a battery and a first communication count of background processes, wherein the first power loss amount is a decrease of power with respect to power at a first moment, the first moment is a moment at which the electronic device enters the first mode, and the first communication count is used for indicating a total communication count of all processes currently running in the background with other devices since power-on of the electronic device;

obtaining power of the battery corresponding to a second moment and current power of the battery corresponding to a current moment, wherein the second moment is a start moment of a second preset duration, and the second preset duration is a duration within which power records are kept; and obtaining a second power loss amount corresponding to the current moment by subtracting the current power of the battery from the power of the battery corresponding to the second moment, wherein the second preset duration is greater than a first preset duration;

obtaining a communication count corresponding to the second moment and a current communication count corresponding to the current moment;

obtaining a communication count variation by subtracting the communication count corresponding to the second moment from the current communication count; and in response to the electronic device determining that within the first preset duration, the second power loss amount has reached a preset power threshold and the communication count variation has reached a preset variation, disabling a network communication connection.

13. The non-transitory computer-readable storage medium of claim 12, wherein determining the first power loss amount of the battery comprises:

obtaining initial power of the battery corresponding to the first moment and power of the battery at a third moment; and obtaining a power loss amount corresponding to the third moment by subtracting the power of the battery at the third moment from the initial power.

14. The non-transitory computer-readable storage medium of claim 12, wherein determining that the electronic device has entered the first mode comprises:

determining, based on at least one of ambient light data, touchscreen data, motion posture data of the electronic device, GPS data, and user sleep data, that the electronic device has entered the first mode.

15. The non-transitory computer-readable storage medium of claim 12, the operations further comprising:

when the electronic device receives user operation data, enabling the network communication connection.

16. The non-transitory computer-readable storage medium of claim 15, wherein the user operation data comprises operation data of tapping a touchscreen.

17. The non-transitory computer-readable storage medium of claim 15, wherein the user operation data comprises operation data of a location change obtained by the electronic device.

18. The non-transitory computer-readable storage medium of claim 12, wherein determining that the electronic device has entered the first mode comprises:

determining, based on ambient light data, that the electronic device has entered the first mode.

19. The non-transitory computer-readable storage medium of claim 12, wherein determining that the electronic device has entered the first mode comprises:

determining, based on touchscreen data, that the electronic device has entered the first mode.

20. The non-transitory computer-readable storage medium of claim 12, wherein determining that the electronic device has entered the first mode comprises:

determining, based on motion posture data of the electronic device, that the electronic device has entered the first mode.

* * * * *

UNITED STATES PATENT AND TRADEMARK OFFICE
CERTIFICATE OF CORRECTION

PATENT NO. : 12,242,324 B2
APPLICATION NO. : 17/904472
DATED : March 4, 2025
INVENTOR(S) : Jianbin Qiu It is certified that error appears in the above-identified patent and that said Letters Patent is hereby corrected as shown below:

In the Claims

In Column 25, in Claim 10, Line 40, after "comprises" delete "of".

Signed and Sealed this
Fifteenth Day of April, 2025

Coke Morgan Stewart
*Acting Director of the United States Patent and Trademark Office*